Aug. 24, 1954     W. Z. JARMICKI     2,687,261
SPOOL CONSTRUCTION
Original Filed July 6, 1948
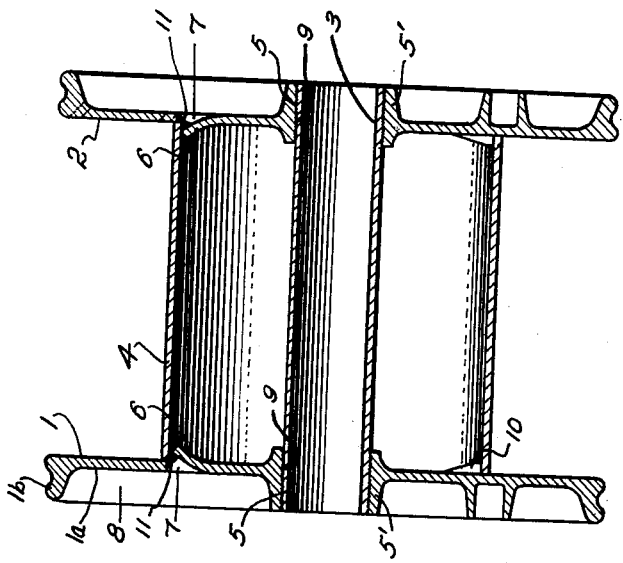
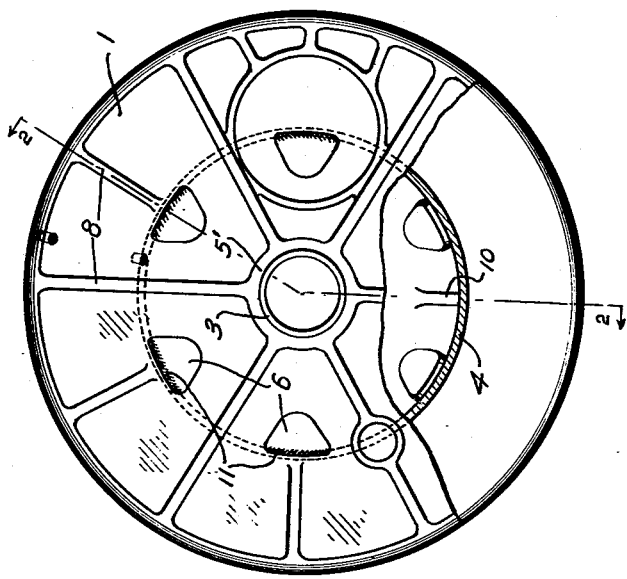
Inventor:
Wincenty Z. Jarmicki
By [signature]
Attorney.

Patented Aug. 24, 1954

2,687,261

UNITED STATES PATENT OFFICE 2,687,261

SPOOL CONSTRUCTION

Wincenty Zygmunt Jarmicki, Toronto, Ontario, Canada, assignor to Dominion Magnesium Limited, Toronto, Ontario, Canada, a corporation of Ontario Original application July 6, 1948, Serial No. 37,142, now Patent No. 2,601,660, dated June 24, 1952. Divided and this application November 7, 1951, Serial No. 255,289

2 Claims. (Cl. 242—123)

This application relates to spools for carrying threads or wires, and is a division of copending application, Serial No. 37,142, filed July 6, 1948, now Patent Number 2,601,660, issued June 24, 1952.

Spools for carrying wires and the like usually comprise four main parts, namely, two similar end flanges, a center tube on the ends of which the flanges are mounted, and a cylindrical drum on which the wire is wound. Various ways of arranging and assembling the parts have heretofore been proopsed with a view to providing economical manufacture. In the larger type of spool having end flanges of, for instance, 8 to 24 inches or greater in diameter, and adapted to carry heavy wires, the problem is to combine ease and economy of manufacture with required strength of structure. Generally speaking, in the past, the rigid assembly of the various parts in relation to each other, in such manner to ensure that the completed spool will withstand all normal strains to which it is subjected, has resulted in relatively involved and costly manufacturing procedures.

It is an object of the present invention to provide a spool for carrying wires and the like which, while possessing necessary strength of structure, is of simple and economical manufacture. More specifically, an object is to provide a spool structure comprising simple and effective assembly means for the tube and barrel in relation to the flanges, and a method of assembling such parts including a single pressing or assembling step and a single welding step.

The invention will be described with reference to the accompanying drawing, in which Figure 1 is an end elevation of one form of spool, and Figure 2 is a longitudinal section on line 2—2 of Figure 1.

Referring to the drawing, the spool comprises two substantially identical end flanges 1 and 2, an axial tube 3, and a drum 4. While the parts may be formed from various materials, it is preferable, for high strength light weight requirements, that the flanges and barrel be made of light alloys such as magnesium and the tube of steel.

Each flange comprises a disc-like member having an axial bore 5 in a hub portion 5' and a series of uniformly spaced inwardly directed lugs or wall portions 6 angularly offset from the wall or annular plane portion 1a of the flange which produce weld openings 7 in the wall. As shown, the lugs 6 and weld openings 7 are radially and uniformly spaced outwardly a short distance from the bore 5. A plurality of strengthening ribs 8 may be provided on the outer surface of the annular plane portion 1a of each flange, such ribs joining a peripheral rim 1b on the flange and the hub 5'.

The outside diameter of the tube 3 is at least as great as the inside diameter of bore 5 to provide a press fit engagement between the ends of the tube and the hubs of the flanges. Preferably, the hub-engaging surfaces of the tube are finely knurled as indicated at 9 to accentuate the frictional engagement of the tube and hubs.

The inside diameter of the drum 4 coincides approximately with the diameter of a circle passing through the outer limit of the weld openings 7. Thus, the deflected wall portions 6 constitute positioning lugs for the drum to locate it in proper relative position with respect to the end flanges. However, if desired, separate drum locating lugs 10 on the inside surface of the flanges may be provided.

It will be observed that, with the four parts of the spool arranged in axial relation, a single pressing operation is sufficient to assemble the tube and flanges and to position the drum in proper relation thereto. Thereafter, the drum is welded to the outer edge of each opening 7 and to the deflected adjacent edge portion of lug 6, as indicated at 11, this operation being readily effected from the ends of the spool.

Thus, the assembly of the spool involves two simple steps only, a pressing or assembling step and a welding step. The resulting spool possesses great strength and rigidity amply sufficient to withstand all normal stresses to which it may be subjected in use.

I claim:

1. A spool for wire comprising a pair of end discs each having a peripheral rim, an axial hub, an annular plane portion joining said rim and hub, said hub extending forwardly and rearwardly of said plane portion, a plurality of ribs on the external surface of said plane portion joining the rim and hub, and a series of inwardly deflected and uniformly spaced offset wall portions in said plane portion arranged in alternate relation to certain of said ribs and in uniform radial relation to the hub each said deflected wall portion providing a complementary wall opening in the plane portion, an axial supporting tube having its end portions anchored in said hubs by press fitting engagement therewith and having its ends terminating within the hubs, and a drum having its ends terminating in engagement with the inner walls of the discs and each overlying a series of said offset wall portions, the inner surfaces of said ends being welded to said offset wall portions and to the adjacent edges of said openings, said tube and drum being otherwise free of attachment to the discs.

2. A spool as defined in claim 1, said discs and drum being formed of magnesium alloy, and said tube being formed of steel.

References Cited in the file of this patent

UNITED STATES PATENTS

| Number | Name | Date |
|---|---|---|
| 602,241 | Pendleton | Apr. 12, 1898 |
| 602,260 | Klots | Apr. 12, 1898 |
| 1,207,485 | Bowen | Dec. 5, 1916 |
| 1,248,830 | Dunham | Dec. 14, 1917 |
| 1,842,113 | Quigg | Jan. 19, 1932 |
| 1,999,422 | Reutter | Apr. 30, 1935 |
| 2,352,501 | Slavicek | June 27, 1944 |

FOREIGN PATENTS

| Number | Country | Date |
|---|---|---|
| 64,161 | Norway | Nov. 17, 1941 |